US011720835B2

(12) United States Patent
Matula et al.

(10) Patent No.: US 11,720,835 B2
(45) Date of Patent: Aug. 8, 2023

(54) CONTEXT BASED CHANNEL SWITCHOVER

(71) Applicant: Avaya Management L.P., Durham, NC (US)

(72) Inventors: Valentine C. Matula, Granville, OH (US); Manish Negi, Pune (IN); Divakar Ray, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/185,599

(22) Filed: Feb. 25, 2021

(65) Prior Publication Data

US 2022/0270020 A1   Aug. 25, 2022

(51) Int. Cl.
| | | |
|---|---|---|
| *H04M 3/00* | (2006.01) | |
| *G06Q 10/0631* | (2023.01) | |
| *H04M 3/523* | (2006.01) | |
| *H04M 3/51* | (2006.01) | |
| *H04L 67/148* | (2022.01) | |

(52) U.S. Cl.
CPC .... *G06Q 10/063112* (2013.01); *H04L 67/148* (2013.01); *H04M 3/5175* (2013.01); *H04M 3/5233* (2013.01)

(58) Field of Classification Search
CPC . H04M 3/5175; H04M 3/5233; H04L 67/148; G06Q 10/06311
See application file for complete search history.

(56) References Cited

U.S. PATENT DOCUMENTS

| | | | |
|---|---|---|---|
| 9,386,152 B2 | 7/2016 | Riahi et al. | |
| 11,388,727 B1 * | 7/2022 | Argenti | ................. H04W 40/02 |
| 2008/0152094 A1 * | 6/2008 | Perlmutter | .......... H04M 3/4936 |
| | | | 379/88.01 |
| 2016/0371703 A1 * | 12/2016 | Monegan | .............. H04L 67/148 |
| 2018/0084112 A1 * | 3/2018 | Bell | .................. H04M 15/8038 |
| 2022/0256433 A1 * | 8/2022 | Dhawan | .............. H04L 43/0841 |

FOREIGN PATENT DOCUMENTS

CA         2959325         8/2018

\* cited by examiner

*Primary Examiner* — Rasha S Al Aubaidi
(74) *Attorney, Agent, or Firm* — Sheridan Ross P.C.

(57) ABSTRACT

The present disclosure provides, among other things, methods and systems of managing a first channel, including: receiving a request for a communication session on the first channel; determining that a monitored attribute of the communication session has met a first threshold; comparing, by a channel change analysis, a first performance measure of the first channel with a second performance measure of a second channel; and managing a channel change based on the determining and the channel change analysis.

20 Claims, 6 Drawing Sheets

CONTEXT BASED CHANNEL SWITCHOVER

FIELD

Embodiments of the present disclosure relate generally to contact centers and particularly to managing communication session channels in a contact center.

BACKGROUND

The contact center is a hub of communications between business and customers, connecting agents and customers over multiple channels to facilitate sales and support to deliver the best possible customer service. An efficient contact center will improve the performance to deliver a prompt and informed service to customers.

BRIEF SUMMARY

When customers connect with an agent on a channel to conduct a communication session, they may not have connected to the agent on an optimal channel. This may be due to various factors, for example, when a customer is using a particular channel, they may not be able to explain their problem clearly to the agent or the agent may not be able to effectively understand the problem and/or effectively respond to the customer. In some circumstances, this may occur when a voice channel is being used but there is a language barrier such as a problematic accent on the part of the customer and/or the agent. Sometimes, the quality of agents available on different channels may differ to the point where agents on one channel may be better suited to effectively handle the communication session than agents on another channel. As another example, the customer and/or agent uses a channel that is not optimal because they may not realize that there is another channel that would be more effective for handling the communication session. In other instances, sometimes a customer is connected to an agent on a randomly available channel, where the randomly available channel is not an optimal channel. These types of problems that occur when a customer connects to an agent using a suboptimal channel can negatively affect the customer's current communication session and also negatively impact a customer's experience with the contact center as well as negatively impact the contact center itself.

Customers and agents may be referred to herein as users, and include people, participants, callers, callees, recipients, senders, humans, human agents, agents, administrators, employees, members, attendees, and variations of these terms. Thus, in embodiments disclosed herein, although the embodiments may be discussed in terms of customers and agents, the embodiments include communications between any type and number of users including a customer communicating with a customer and an agent communicating with an agent. Embodiments may also be directed to communication sessions with more than two participants. The term "optimal channel" as used herein can be any one or more channels that is more desirable than another channel or set of channels. A channel is any communication medium for conducting a communication session, such as a physical transmission medium or a logical connection over a multiplexed medium. Examples of channels used to conduct communication sessions include voice, video, text, email, chat, etc.

Embodiments of the present disclosure advantageously provide methods and systems that actively monitor some or all of a communication session or a requested communication session (e.g., a communication session that has been initiated by a user but not yet connected). The monitoring may be used to determine if a channel change should be managed. The communication session may be monitored for any information (also referred to herein as attributes) related to one or more of the users, the channel(s), and/or the communication session itself. Information related to the users includes and is not limited to sentiment of one or more users (e.g., if a certain sentiment, a polarity of sentiments, and/or an urgency of a sentiment is detected). Monitored information can also include performance measures that occur before, during, and/or after the communication session. Other monitored information can include context (including key words or other content related to a communication session), a complexity of the communication session (e.g., complexity of words used by a user), agent availability, agent skill(s) and relative skill levels of available agents on each channel, and success rate of past attempted channel. Historical information may be used to determine if a channel change should be managed, and in some embodiments a comparison of monitored information to historical information is used to determine if a channel change should be managed. As used herein, managing a channel change includes any managing action that relates to a channel change such as analyzing information and/or adding, removing, or switching a channel and the actions associated therewith (e.g., configuring a channel change suggestion, sending and/or displaying a channel change suggestion, and receiving a response about a channel change suggestion).

A channel may be managed when the system detects that a customer is having difficulty explaining themselves clearly or when there is a problem of understanding between an agent and a customer. The detection of the difficulty and/or problem(s) may occur by monitoring information. The monitoring may be static or dynamic; thus, may occur at only one point in time (e.g., when a request for a communication session is received or when a communication session is connected), at multiple points in time, and/or be ongoing. Attributes include information related to the contact center such as call wrap-up time (e.g., if the wrap-up time used by the agent meets or exceeds a threshold, where the threshold may be related to a specified amount of wrap-up time), agent response time, and attributes related to a Service Level Agreement (SLA) among others. If difficulty and/or problems are detected, the systems and methods may analyze the channel(s) being used and channel(s) available to determine whether a change to the channel(s) may be beneficial. The systems and methods may then manage a channel change to improve upon the detected difficulty and/or problems.

Attributes include performance measures, which include targets for measured metrics (e.g., Service Level Agreements (SLAs)), statistical information related to agent data (such as measures related to agent activity, e.g., states or events, including but not limited to service level, occupancy and/or performance), and a specific queue and/or skill (such as measures related to abandoned calls, cancelled calls, and busy signals, among others) related to the contact center. Additional examples of performance measures include any type of Key Performance Indicator (KPI) monitored and/or tracked in a contact center. Non-limiting examples of contact center KPIs include occupancy or service level (e.g., expressed as a percentage, which can help identify how much time an agent is actually "speaking live" to customers where a higher percentage is desirable), abandoned calls, percentage abandoned, calls answered, calls offered, Average Wait Time (AWT), grade of service (e.g., number of calls answered within x seconds or Average Handle Time (AHT)), conversion, average call length, first call resolution (as a percentage), customer call frequency, average age of query, combinations thereof (e.g., net promoter score (NPS)), and the like.

In some embodiments, systems disclosed herein may be installed in a contact center and monitor the interactions between the customer and the agent. Artificial intelligence (AI), including the utilization of machine learning (ML), can be used in various aspects disclosed herein. One or more aspects of managing a channel change may be automated (e.g., without human input). For example, based on the monitored attributes, an artificial intelligence system may suggest a channel change (e.g., a channel switchover, addition, or removal) for the customer to continue the communication session, where the suggested channel change may improve the ease and effectiveness with which the customer and the agent communicate. An artificial intelligence system determine that changing a channel may be beneficial (e.g., by providing a shorter call handling time, a better probability of upsell, a better probability of collecting a bill, etc.). The artificial intelligence system can find a mismatch between customer and agent and find a better match on a particular channel that could help resolve the mismatch. Thus, the artificial intelligence system can suggest to the customer to change the channel in order to increase the effectiveness of the communication session.

Embodiments of the present disclosure may advantageously assist customers to achieve an improved communication experience by suggesting an optimal channel (or channels) to use for their communication session. Artificial intelligence may advantageously be used to determine when and how to change channels, and the determinations may be made using an ongoing context of the communication session that is monitored. The suggested channel change can benefit the customer, such as by enabling the customer to better explain the problem, enabling the customer to better understand an agent's instructions, enabling the agent to provide a clearer resolution, etc. The disclosed embodiments therefore can improve communications between customers and agents (e.g., by improving understanding). Improvements in understanding in turn advantageously improve performance measures as efficiency increases and/or customer satisfaction increases.

Performance measures that may be improved by the systems and methods disclosed herein include wrap-up times, agent response times, call abandon rate, and call SLA times. For example, call SLA times may be negatively impacted when there is a problem with an agent understanding a customer, and vice versa, because it can take additional time to establish a clear understanding. As the call SLA time increases, customers who are waiting to be connected to an agent spend a longer amount of time waiting, and this increases customer frustration. Then, when the customer finally reaches an agent, the customer is more likely to have a poor customer experience. This can be true especially if there is a high complexity for the content of the communication session and a poor understanding between the customer and the agent. Also, as the wait time is increased, not only does the customer satisfaction decrease, but the amount of calls dropped (e.g., from customers hanging up after too long of a wait) increases, which is disadvantageous not only for the customer but also for the contact center.

Channels may be managed in any manner. For example, a channel may be switched (e.g., changed to a different type of channel) or added. In addition, a channel may be reduced (e.g., dropped). For example, if a customer is using multiple channels to communicate with one or more agents, the system may suggest that one or more of the channels be closed in order to reduce the number of channels being used.

In some aspects of the disclosure, a channel may be managed while maintaining a same agent (e.g., a same agent is handling the communication session before and after the channel is changed). In other aspects of the disclosure, an agent may be added or removed when a channel is switched, added, or dropped. For example, an agent handling a communication session before the channel is changed may be different from an agent who handles the communication session after the channel is changed. Further, a same agent can communicate with a customer on a channel that remains open while another channel is added for the same agent so that the customer is communicating with the same agent on two (or more) channels. Likewise, a same agent can communicate with a customer on multiple channels, and the same agent can continue to communicate with the customer as one or more of the multiple channels is removed (e.g., dropped).

In some embodiments, when a customer engages with a contact center and the system detects a difficulty or problem, then the system may determine if there is any history for the customer or for the difficulty or problem. This can be one way in which the system can determine if there are one or more channels on which the difficulty or problem has been handled with greater efficiency. The determination may be based on historical information related to the customer, the contact center, and/or the channel(s). For example, other information that can be considered by the system includes and is not limited to historical information about channels proposed to and/or selected by other customers from similar geographical regions, languages, having similar content of the communication, and/or having similar problems. Artificial intelligence systems may be used to implement the use of historical information in embodiments disclosed herein. Any of the information can be used to select one or more channels to offer to the customer. In addition, if a channel change proposed by the system results in a more efficient call handling, or other advantageous effects for the customer and/or the contact center, then the information about the successful channel change may be used by the system to train the artificial intelligence training model feed. Likewise, if a channel change proposed by the system results in a less efficient call handling, or other disadvantageous effects for the customer and/or the contact center, then the information about the unsuccessful channel change may be used by the system to train the artificial intelligence training model feed.

The systems and methods disclosed herein may use a channel management engine in various embodiments. In some embodiments, the channel management engine may use artificial intelligence and models to determine how to manage communication sessions and channel changes. For example, model(s) may be built using performance measures and other input data. The input data can include for example sentiment analysis, historical information, and any other information related to users, communication sessions, and contact centers. Model(s) can be configured in any way, including through the use of comparisons and thresholds, and the model(s) can detect that something is going wrong when monitoring the communication session. Thus, the model(s) may be used to manage channel changes.

Artificial intelligence may predict that a problem or a less than optimal situation could or will occur and then manage a channel change based on the prediction. The artificial intelligence system may learn by observing the results of a communication session, such as the length of a call, an amount of a bill collected, hold times, wrap-up times, etc., in order to learn which results are beneficial and how they relate to channel changes. The artificial intelligence system may also learn from presenting a user with a survey that gathers information about whether a changed channel was useful at the time that it was added, or not, and can collect other information, such as whether the agent and/or customer would have preferred that the channel had been changed earlier. The artificial intelligence system can use input from quality systems, including input from quality monitors (e.g., call analysis, a quality manager agent, etc.). All of these types of input may be used to train the artificial intelligence system in order to manage channel changes or improve the management of channel changes.

In some aspects, systems and methods disclosed herein may manage a channel change before a communication session is connected. For example, if a customer attempts to connect to an agent on a first channel, before the connection occurs (e.g., before an agent is connected to a customer) the system may analyze information associated with the requested communication session in order to manage a channel change. Thus, in various embodiments, the system may suggest changing the channel before the communication session is established. In various embodiments, the attempted first channel is not used because a channel change is suggested and accepted (or automatically implemented) before the communication session is connected on the requested (e.g., a first) channel so that the communication session is only connected using a suggested (e.g., a second) channel instead. However, in various embodiments disclosed herein, a suggested change to a channel may be declined (e.g., by the customer and/or the agent) so that a change to the channel may not occur. In some aspects, the suggested channel change may be automatically managed, including being timed out if a user does not respond within a certain amount of time. Thus, in some embodiments, the communication session proceeds without any change to the channel.

The artificial intelligence systems disclosed herein may advantageously guide a customer-agent interaction to an improved channel selection (or a selection of an improved combination of channels) that increases the efficiency or the results of the interaction. In certain aspects, if a channel change is proposed before connecting a communication session, then this may help select a more efficient channel, or channels, for the communication session.

In an illustrative example, if the monitoring includes monitoring key words and a customer states that they don't understand or asks the agent to repeat themselves, then a channel change analysis or channel change suggestion can occur. As another illustrative example, a customer may call for service; however, upon analyzing the proposed interaction, an artificial intelligence system can determine that chat agents are actually more proficient for this type of interaction. Based on the artificial intelligence analysis, the artificial intelligence system can determine that the call should be switched to a chat channel and the system may therefore change the channel of the call by prompting the customer and/or the agent to switch the communication session from a voice session to a chat session, or by switching the communication session to a chat agent who is able to add voice (or maintain the voice channel).

Various embodiments disclosed herein use thresholds. In some aspects, if a channel change analysis occurs, one or more results of the analysis may be compared to one or more thresholds. If the result(s) meet or exceed the threshold(s), then one or more actions may be taken, for example the systems or methods could suggest a channel change.

A threshold may be used in combination with attributes, such as key words, historical data, sentiment analysis, and/or performance measures. In some embodiments, a threshold may be singular (e.g., a target or a trigger), where when the threshold is met or exceeded, then an action related to a channel change occurs (e.g., a channel change is managed). In some embodiments, a threshold may be a single instance such as a single mention of one or more words. In other embodiments, multiple thresholds (or a threshold related to multiple instances of a variable occurring) may be implemented, such as a repeated mention of one or more words or a secondary threshold that depends, at least in part, upon an initial threshold being met. There may be any combination of thresholds used, such as one action for a hold time of a first amount, and a different action for a hold time of a second amount. Thresholds may be managed by a user, automatically, and/or by artificial intelligence.

Comparisons may be used in embodiments disclosed herein. For example, systems and methods disclosed herein may compare information about one channel with information about another channel, compare information about one agent with information about another agent, compare information about one customer with information about another customer, etc. Comparisons may be used in combination with thresholds.

Channel change suggestions may be sent or displayed to any user(s). A channel change suggest may be made to the customer and/or the agent. In various embodiments, a channel change suggestion may be sent to a customer for approval or confirmation to proceed with the channel change. In other embodiments, the channel change suggest may be sent to an agent, or the channel change suggestion may be sent to multiple users. In some aspects, notifications are sent. For example, a notification may be sent to a user before a channel change is automatically implemented, or a notification may be sent to an agent that a suggested channel change is being sent to a customer. Channel change suggestions, like other channel change actions, may be managed by a user, automatically, and/or by artificial intelligence.

In various embodiments, any user may manage a suggested channel change. For example, a user may be provided with the means to execute a suggested channel change for the communication session. This may occur before the communication session is connected or while the communication session is in progress. As one illustrative example, a customer may be sent a link to click on, where the link will execute the channel change. A link may be sent regardless of what type of channel change (e.g., a change/switchover, addition, or removal of a channel) is being suggested. Further, any of the users involved in the communication session may not need to pay attention to when, how, and if the change happens because the systems and methods can ensure the continuity of the ongoing engagement without showing the details to the user. Thus, a user may select to approve or deny a channel change, and the system can follow through with the user's selection without further input from any of the users.

In some aspects, a user may choose a channel type at any point in time before or during the communication session. Thus, for example, a customer may receive a link as a suggested channel addition and may not select the link to confirm the addition of the channel until a later point of time in the communication session. In other embodiments, a user may have access to one or more suggested channel changes (e.g., via a display) and may select one or more channel changes at any point during the communication session.

If the channel change is a channel switch or adds a channel (e.g., change a channel type), then an agent handling the communication session after the switch may be provided with one or more attributes of the communication session so that the agent is better aware of the content and circumstances of the communication session. The attributes may be key, or important, attributes that include customer information and information about the content of the communication session or other attributes of the communication session including key words. By obtaining the attributes prior to being connected to the customer, the quality of service can be improved and efficiencies can be increased; for example, the agent can ask a reduced number of questions to the customer or more targeted or specific questions to the customer. When a customer is asked less questions, it advantageously helps to improve the customer sentiment, and when a customer is asked more specific questions, it can also advantageously make the customer feel more pleased by directing the conversation more specifically to their concerns or exact problem.

As another illustrative example, if the system suggests a channel change to a customer from a voice channel to a chat channel and the customer agrees, then attributes from the monitored call may be used to create the chat session so that the agent involved in the chat session may be aware of attributes of the communication session that occurred before the chat session. For example, in some embodiments, attributes may be provided to an agent as a heads-up chat template. Also, a customer may be brought into a chat session (e.g., a chat room) by providing a room identification number to the customer. The room identification number or any other type of connection to a new channel may be provided to the customer via a link in a messaging application such as a Short Message Service (SMS), a Uniform Resource Locator (URL), or via any other media or application. The customer may select the room identification number (or link) in order to connect themselves directly to the agent on the new channel (e.g., the agent who has received the heads-up chat template).

Further, if the channel change is proposed prior to the start of the communication session, or at the beginning of the communication session, the contact center can advantageously improve its load balancing (e.g., achieve a more optimal and efficient load balancing between channel agents in the contact center). This advantageously can reduce agent engagement time and improve efficiency of call handling, as well as improving agent SLA and customer satisfaction.

Further embodiments may advantageously use call wrap-up time. Wrap-up time is a state where the agent is not in a communication but is also not being considered for assignment to a new communication (e.g., the agent state would be "available"). The number of times that an agent adjusts the wrap-up time (e.g., incurs violations for exceeding a specified amount for a wrap-up time of a particular communication session) may be summarized for review and consideration in metrics of the contact center. For example, when a threshold for a call wrap-up time has been met or exceeded (which can depend on which business trained model is being used to provide thresholds for the wrap-up times), the system may search for a channel on which the customer may be more efficiently assisted. In some cases, the artificial intelligence system may determine that a chat channel or an email channel is more efficient for the particular type of customer or type of communication session (e.g., the artificial intelligence system may know that previous customers or communication sessions of a same or similar type were advised and assisted with an improved outcome by using a chat or email channel instead of a voice channel). Based on this determination, the system may propose a channel change to the customer without interrupting or stopping the current call flow of the on-going communication session. The system may thereby capture the entire communication session of the customer with the agent (e.g., via monitoring the communication session), and then use the captured information to determine attributes of the customer or the communication session in the systems and methods disclosed herein.

The systems and methods disclosed herein may use any information associated with a contact center to manage channel changes. Examples of internal information includes but is not limited to call recordings, communication transcripts, customer histories, and agent reports. Internal information may be obtained from databases maintained by the contact center, from information collected within the contact center or from contact center interactions, and from other business rules and business data of the contact center. This internal information advantageously constitutes a valuable resource that can enable improvements to the methods and systems described herein because the managed channel changes can help to improve the customer experience and also improve contact center processing (including routing efficiency and agent SLA).

Agents may have a control on their display that conveys various information, including information about one or more current communication sessions. In some embodiments, agents can see the control change state (and change the visual indication of the control) to indicate a channel change or a suggested channel change. In various embodiments, the agent may control a channel change.

Embodiments of the present disclosure can improve contact center performance against key performance metrics by improving how channel changes is implemented (e.g., using artificial intelligence and machine learning). This is advantageous because data mining and machine learning tools and techniques can discover properties about the communication session that can inform improvements to channel selection for each customer communication session.

Improved channel changes will contribute to improvements in the contact center processing efficiency and will minimize unnecessary utilization of contact center resources, including hardware. Furthermore, improvements in handling channel changes will improve staff and resource utilization.

According to some aspects of the present disclosure, a method of managing a first channel includes: receiving a request for a communication session on the first channel; determining that a monitored attribute of the communication session has met a first threshold; comparing, by a channel change analysis, a first performance measure of the first channel with a second performance measure of a second channel; and managing a channel change based on the determining and the channel change analysis.

In some embodiments, the managing includes sending a suggestion to execute the channel change.

In some embodiments, the first performance measure includes the monitored attribute.

In some embodiments, the monitored attribute is a sentiment.

In some embodiments, the communication session is between a customer and an agent of a contact center, and where the sentiment is a customer sentiment.

In some embodiments, the managing is a suggestion to change the first channel to the second channel, and the suggestion is sent as a link to the second channel.

In some embodiments, the suggestion is sent prior to the communication session being connected on the first channel.

In some embodiments, the managing is a suggestion to add the second channel to the first channel, and the suggestion is sent as a link to the second channel.

Another aspect of the present disclosure is that the method further includes: receiving a confirmation to change the channel to the second channel.

Another aspect of the present disclosure is that the method further includes: receiving a rejection of the channel change including instructions to not change the first channel to the second channel.

Another aspect of the present disclosure is that the method further includes: storing a result of the channel change analysis in a database including channel change information; enabling a machine learning process to analyze the database; and updating a data model used to automatically determine channel change management based on the analysis of the machine learning process.

In some embodiments, the data model is used to automatically classify channel changes, and the method further includes managing a second channel change related to the first channel based on the automatic classification.

In some embodiments, the machine learning process performs an analysis of a sentiment contained in the communication session.

According to some aspects of the present disclosure, a communication system includes: a processor; and computer memory storing data thereon that enables the processor to: receive a request for a communication session on the first channel; determine that a monitored attribute of the communication session has met a first threshold; compare, by a channel change analysis, a first performance measure of the first channel with a second performance measure of a second channel; and manage a channel change based on the determining and the channel change analysis.

In some embodiments, the processor is further enabled to send a suggestion to execute the channel change.

In some embodiments, an agent of a contact center is participating in the communication session, and the monitored attribute is a customer sentiment.

In some embodiments, the processor is further enabled to change the first channel to the second channel.

In some embodiments, the processor is further enabled to provide a heads-up chat template to an agent associated with the second channel.

In some embodiments, the processor is further enabled to: store a result of the channel change analysis in a database including channel change information; enable a machine learning process to analyze the database; and update a data model used to automatically determine channel change management based on the analysis of the machine learning process.

According to some aspects of the present disclosure, a contact center includes: a server including a processor and a channel change engine that is executable by the processor and that enables the processor to: receive a request for a communication session on the first channel; determine that a monitored attribute of the communication session has met a first threshold; compare, by a channel change analysis, a first performance measure of the first channel with a second performance measure of a second channel; and manage a channel change based on the determining and the channel change analysis.

According to some aspects of the present disclosure, a method of managing a first channel includes: receiving a request for a communication session on the first channel; determining that a monitored attribute of the communication session has met a first threshold; performing, based on the determination, a channel change analysis based on the first channel and the monitored attribute, where the channel change analysis determines a second channel having an improved performance measure; and sending a suggestion to execute a channel change to the second channel based on the channel change analysis.

According to some aspects of the present disclosure, a method of managing a first channel includes: receiving a request for a communication session on a first channel; determining a first attribute associated with the first communication session; comparing the a communication statistic of the first channel and a second channel, where the communication statistic is related to the first attribute; and sending a suggestion to execute a channel change to the second channel based on the channel change analysis.

As used herein, a communication may also be referred to as an "engagement," a "message," and a "communication session" and may include one or multiple electronic records, text, rich media, or data structures that are transmitted from one communication device to another communication device via a communication network. A communication may be transmitted via one or more data packets and the formatting of such data packets may depend upon the messaging protocol used for transmitting the electronic records over the communication network.

As used herein, an agent state or state of an agent may include one or more of an AVAILABLE state, an OCCUPIED state, a BUSY state, an AFTER-CALL WORK (ACW) state also referred to as a TIMED AFTER-CALL WORK (TACW) state or a wrap-up time, an UNAVAILABLE state, or any other agent state known or yet to be developed for use in a contact center.

As used herein, a model or data model may correspond to a data set that is useable in an artificial neural network and that has been trained by one or more data sets that describe conversations or message exchanges between two or more entities. The data model may be stored as a model data file or any other data structure that is useable within a neural network or an artificial intelligence system.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed.

Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Illustrative hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using artificial intelligence, machine learning, neural networks, or the like. In other words, a system or contact center is contemplated to include finite instruction sets and/or artificial intelligence-based models/neural networks to perform some or all of the steps described herein.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides illustrative embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the illustrative embodiments will provide those skilled in the art with an enabling description for implementing an illustrative embodiment. It should however be appreciated that the present disclosure may be practiced in a variety of ways beyond the specific detail set forth herein.

While the illustrative aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Embodiments of the disclosure provide systems and methods for machine learning tools to support the management of channels of a contact center. Embodiments of the present disclosure are also contemplated to automatically suggest and implement channel changes, as appropriate, based on an analysis of customer and/or contact center information.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
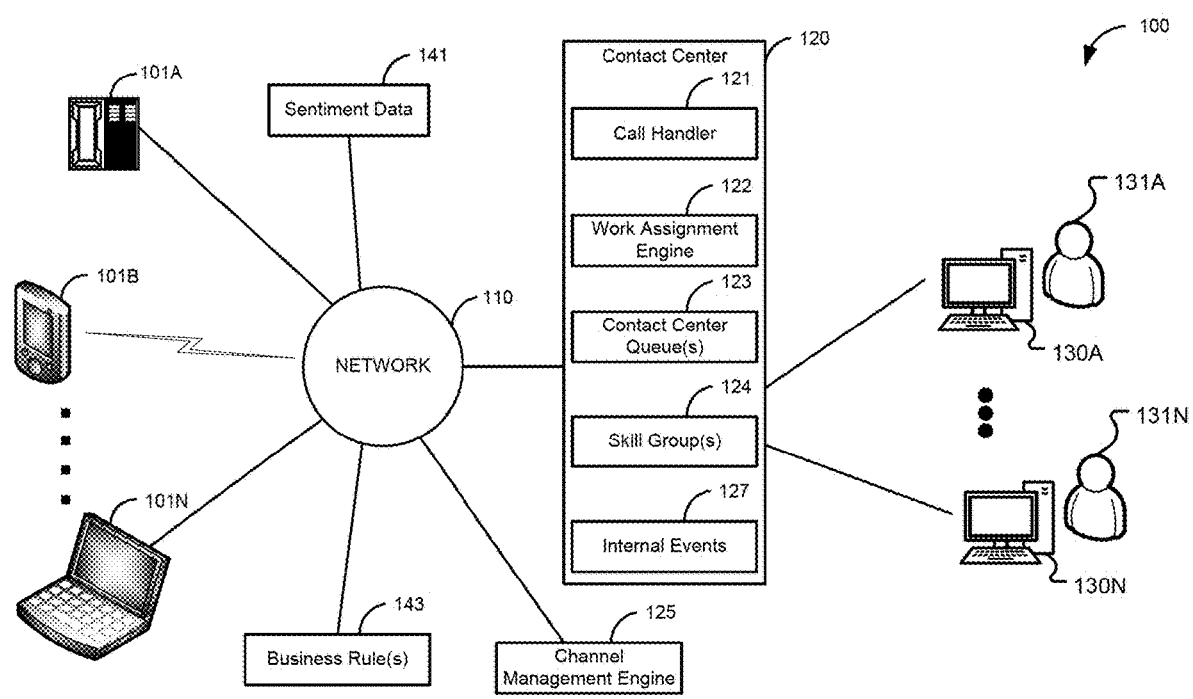
FIG. 1 is a block diagram illustrating a communication system in accordance with at least some embodiments of the present disclosure.

Referring initially to FIG. 1, a block diagram illustrating a communication system 100 in accordance with at least some embodiments of the present disclosure is shown. The first illustrative system 100 comprises communication endpoints 101A-101N, a network 110, the contact center 120, agent terminals 130A-130N, sentiment data 141, business rule(s) 143, and channel management engine 125. The contact center 120 typically also has contact center agents (human agents) 131A-131N that service communications in the contact center 120. Although the terms "communication(s)" and "communication session(s)" may be used interchangeably herein, a communication session may include multiple communications (e.g., the communications of the communication session may be related by a common user, a common endpoint, etc.). Various components of FIG. 1 are stored on one or more memory devices (not shown).

Memory of the system 100 may include one or multiple computer memory devices. The memory may be configured to store program instructions that are executable by one or more processors (not shown) and that ultimately provide functionality of the systems described herein. The memory may also be configured to store data or information that is useable or capable of being called by the instructions stored in memory. The memory may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory, in some embodiments, corresponds to a computer-readable storage media and the memory may correspond to a memory device, database, or appliance that is internal or external to the contact center 120.

The communication endpoints 101A-101N may correspond to a computing device, a personal communication device, a portable communication device, a laptop, a smartphone, a personal computer, and/or any other device capable of running an operating system, a web browser, or the like. For instance, communication endpoints 101A-101N may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication endpoints 101A-101N may also have any of a variety of applications, including for example, a database client and/or server applications, web browser applications, chat applications, social media applications, calling applications, etc. A communication endpoint 101A-101N may alternatively or additionally be any other electronic device, such as a thin-client computer, Internet-enabled mobile telephone, and/or personal digital assistant, capable of communicating via communication network 110 and/or displaying and navigating web pages or other types of electronic documents.

As shown in FIG. 1, any number of communication endpoints 101A-101N may be connected to the network 110. Users (not shown) of the communication endpoints 101A-101N interact with their communication endpoints 101A-101N to communicate with a resource (e.g., agents 131A-131N) of the contact center 120. For example, the contact center 120 may include a number of resources that facilitate user interactions via one or multiple communication channels that are presented to and maintained for use by the customers and one or more of their communication endpoints 101A-101N. Users may be associated with entities, and an entity may be referred to herein as a business (businesses include a call center and a contact center), an organization, a group, an institution, and variations of these terms. A customer may utilize one or multiple of the communication endpoints 101A-101N to interact with the contact center. Alternatively or additionally, a customer may use one of their communication endpoints 101A-101N to send different types of messages (e.g., email, chat, SMS, etc.) to the contact center 120 and/or to communicate with the contact center 120 via a voice channel.

The network 110 can be any type of network familiar to those skilled in the art that can support data communications using any of a variety of commercially-available protocols, including without limitation SIP, TCP/IP, SNA, IPX, AppleTalk, and the like. By way of example, network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), H.323, video protocols, email protocols, cellular protocols, Instant Messaging (IM) protocol, and/or the like. Thus, the network 110 is an electronic communication network 110 configured to carry electronic messages via packets and/or circuit switched communications.

The network 110 can communicate with one or more systems that are external to the contact center 120. For example, the network 110 can communicate with sentiment data 141, business rule(s) 143, and/or channel management engine 125. The sentiment data 141 can be or may include any type of sentiment data, such as image (e.g., facial image, body image, video image) classification data, text (e.g., phrase, key word, etc.) classification data, natural language processing rules, linguistic information, biometrics, and/or the like. The business rule(s) 143 can be or may include any types of rules related to one or more businesses or units of a business. For example, business rules can define structure to operations, people, processes, business behavior, and/or computing systems in an organization, and the like.

The contact center 120 is shown to include one or more computing devices (e.g., terminals 130A-130N) that enable a contact center agent 131A-131N to interact with a customer via one or more communication channels established between the communication endpoint 101A-101N and the contact center 120. The contact center 120 can be or may include any hardware coupled with software that can manage communications (incoming and/or outgoing) that are routed to and/or from agents 131A-131N. For example, the contact center 120 can include a network border device (not shown) and a number of servers (not shown) that enable functionality of the contact center 120. In some embodiments, each server of the contact center 120 may be configured to perform a particular task or a set of tasks specific to supporting functions of the contact center 120. The contact center 120 may comprise multiple distributed contact centers 120. For example, the contact center 120 may comprise a contact center 120 in the United States and a contact center 120 in Canada.

The contact center 120 further comprises a call handler 121, work assignment engine 122, contact center queue(s) 123, skill group(s) 124, and internal events 126. The call handler 121 can be any hardware coupled with software that can route communications in the contact center 120, such as a Private Branch Exchange (PBX), a switch, a session manager, a communication manager, a router, an email system, an instant messaging system, a text messaging system, a video switch, and/or the like. The call handler 121 can route various kinds of communications, such as voice calls, video calls, Instant Messaging (IM), text messaging, emails, virtual reality communications, and/or the like. The work assignment engine 122 is able to make routing decisions for incoming communications. In various embodiments, the work assignment engine 122 can make routing decisions for communications in combination with the call handler 121. Aspects of the work assignment engine 122 may be entirely performed by the call handler 121.

The contact center queue(s) 123 are queues for holding incoming and/or outgoing communications for the contact center 120. The contact center queue(s) 123 can hold similar types of communications (e.g., voice calls only) or different types of communications (e.g., voice, video, text messaging, virtual reality, email, and/or IM communications). The contact center queue(s) 123 may be implemented in various manners, such as, on a first-in-first-out (FIFO) basis. In some embodiments, calls may be placed higher in the contact center queues 123 based on various metrics. The contact center queue(s) 123 may be dynamically defined to have different amounts and/or types of communications that can be held in the contact center queue(s) 123. For example, a contact center queue 123 may be initially configured to support twenty voice calls and one hundred emails. Later, the same contact center queue 123 may be dynamically configured to support twenty-five voice calls and thirty IM sessions.

Although not shown, the contact center 120 may be implemented as a queue-less contact center 120. In a queue-less contact center 120, the communications are placed into a pool where contact center agents 131A-131N may select which contacts are to be worked on.

The skill group(s) 124 are groups that are typically associated with one or more products and/or services that are supported by the contact center agents 131A-131N. For example, a first skill group 124 may be created to support high definition televisions and a second skill group 124 may be created to support laptop computers. A skill group 124 may be typically associated with a contact center queue 123. In some embodiments, there may be an individual skill group 124 for each contact center queue 123 (a one-to-one ratio). Alternatively, a skill group 124 may be associated with two or more contact center queues 123 or a contact center queue 123 may be associated with two or more skill groups 124. One of skill in the art could envision various combinations of contact center queue(s) and 123/skill group(s) 124. A skill group(s) 124 may comprise human agent(s) (e.g., contact center agents 131A-131N) and/or non-human agent(s) (e.g., Interactive Voice Response (IVR) system(s), automated agent(s), etc.).

A skill group 124 may be specific to a particular communication type. For example, a product/service may have separate skill groups 124 for voice, video, email, IM, webcast, text messaging, and virtual reality communications. Alternatively, skill groups 124 may support all or only a portion of the supported communication types.

The internal events 127 are events that occur within the contact center. They may include queue updates, agent skillset updates, and performance metrics of the contact center (also referred to herein as performance measures). Performance metrics of the contact center can include metrics that are monitored in the methods and systems disclosed herein, including thresholds.

In some embodiments, all events of the contact center 120 (including all communications that arrive at the contact center 120) may be transferred to the call handler 121 for further analysis and processing (e.g., for assigning a communication to a contact center queue 123, for determination of a communication event such as assigning/forwarding to a particular contact center agent 130A-130N, for processing related to a channel change, etc.). The call handler 121 may correspond to a server or set of servers that are configured to receive communications and make routing decisions for the communications within the contact center 120. A single server or a set of servers may be configured to establish and maintain communication channels between endpoints 101A-101N and the contact center 120. In some embodiments, the call handler 121 may ensure that an appropriate agent or set of agents 131A-131N are assigned to a particular communication channel (e.g., a voice-based communication channel) for purposes of servicing/addressing contacts initiated by customers of the contact center 120 via endpoints 101A-101N.

While certain components are depicted as being included in the contact center 120 (such as the call handler 121), it should be appreciated that one or more components may be provided in any other server or set of servers in the contact center 120. For instance, components of the call handler 121 may be provided in a work assignment engine 122 and/or one or more communication servers (not shown), or vice versa. Further still, embodiments of the present disclosure contemplate a single server that is provided with all capabilities of the work assignment engine 122, the call handler 121, and any communication server(s). The call handler 121 may intelligently route messages to particular agents 131A-131N (or particular inboxes assigned to an agent or queue or pool of agents).

In various embodiments, the call handler 121 may be configured to determine which agent 131A-131N should be assigned to a particular communication channel (e.g., assigned to a particular voice call channel, assigned to a particular message inbox, assigned to a particular chat channel, and/or designated to receive a particular email message) for purposes of communicating with a user (e.g., to provide an answer to a customer's question, to provide a service to a customer, etc.). When communications are received from an endpoint 101A-101N and assigned to a particular communication channel, the call handler 121 may initially assign the communication to a particular communication channel that is hosted by a server.

The call handler 121 may provide appropriate signaling to an agent's communication device 130A-130N that enables the agent's communication device 131A-131N to connect with the communication channel over which the user is communicating and/or to enable the agent 131A-131N to view messages sent by the user's endpoint 101A-101N, which are eventually assigned to and transferred to the appropriate communication channel.

In some embodiments, a server may be responsible for establishing and maintaining a communication channel that is presented to the user's endpoint 101A-101N and which enables the user to send communications to the contact center 120 when desired. As a non-limiting example, the server may correspond to an email server or the like that is configured to process messages received from the call handler 121 and utilize an email messaging protocol (e.g., to inform an agent 130A-130N of a received message, to enable an agent 130A-130N to respond to received messages, etc.). Non-limiting examples of protocols that may be supported by the communication server 128 include Internet Message Access Protocol (IMAP), Post Office Protocol (POP), Simple Mail Transfer Protocol (SMTP), and Exchange. The server may alternatively or additionally be configured to support real-time or near-real-time text-based communication protocols, video-based communication protocols, and/or voice-based communication protocols.

The call handler 121 may be configured to support any number of communication protocols or applications whether synchronous or asynchronous. Non-limiting examples of communication protocols or applications that may be supported by the communication server 128 include webcast applications, the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc.

As discussed herein, information may be identified, collected, and/or analyzed by one or more components shown in FIG. 1 in order to manage a channel change. Channel change management may occur before, during, or after a communication session in order to manage the channel(s) of the communication session. Information may identified, collected, and/or analyzed in real-time and any information that is relevant to a communication session that is occurring may be used to manage the channel(s) of the communication session at any time before the communication session ends. Also, channel changes may be managed more than once for a particular communication session at any time before the communication session ends (e.g., multiple times during a communication session).

The channel management engine 125 can interact with the components of system 100 via network 110. The channel management engine 125 may also interact with other components of the system 100 that are not shown in FIG. 1, such as one or more servers, memory, engines, and machines. For example, the network 110 may be configured to enable a server to communicate with other machines in the contact center 120 and/or to communicate with other machines connected with the network 110.

In various embodiments, memory stores the channel management engine 125 for execution by one or more processors. In some embodiments, the channel management engine 125 may correspond to a set of processor-executable instructions (e.g., a finite instruction set with defined inputs, variables, and outputs). In some embodiments, the channel management engine 125 may correspond to an artificial intelligence component of the contact center 120 that is executed by a processor. The channel management engine 125 may be configured to operate using a set of guidelines (e.g., as a set of static instructions) or by using machine learning. The channel management engine 125 can include additional components and scripts to execute the functionality described herein, as would be understood by a person of ordinary skill in the art. Although the channel management engine 125 is shown as being separate from the contact center 120 in FIG. 1, the channel management engine (or various functionality or components of the channel management engine 125) may be incorporated into the contact center 120 or other components of system 100.

The channel management engine 125 can manage channel changes by, for example, analyzing information, suggesting channel change(s), and implementing channel changes. In embodiments of systems and methods disclosed herein, a channel change suggestion is sent by the channel management engine 125, a customer and/or an agent may confirm the channel change and start or continue the communication session with the selected channel(s) and the communication session is monitored by the channel management engine 125. The communication session may be monitored starting at any point in time from when a request for a communication session is received until the communication session ends, regardless of how many and what types of channel changes are suggested and/or occur. Further, the channel management engine 125 can determine that there are circumstances occurring (or about to occur) that trigger management of the channel(s) based on the monitoring.

The channel management engine 125, in some embodiments, may utilize artificial intelligence and one or more data models, which may be in the form of an artificial neural network, for recognizing and processing information that is relevant to channel change management as described herein. In some embodiments, the channel management engine 125 utilizing machine learning may have access to training data 160 to initially train behaviors of the channel management engine 125 and may be also be programmed to learn from additional information, such as communications and/or channel changes as they occur in real-time, or after the communications and/or channel changes occur. The channel management engine 125 may be configured to learn from any other communications, channel changes, and/or contact center dispositions based on feedback, which may be provided in an automated fashion (e.g., via a recursive learning neural network) and/or a human-provided fashion (e.g., by a human agent of the contact center 120). Illustrative examples of feedback include user (e.g., customer and/or agent) surveys; analysis of communication statistics, channel statistics, and/or other contact center statistics; analysis of channel changes statistics; and quality assurance feedback, including input from a quality manager agent or other agents of a contact center.

In some embodiments, the channel management engine 125 may update one or more of the data models as it learns from ongoing communications, channel changes and/or dispositions within the contact center 120. In various embodiments, the channel management engine 125 manages channel changes by providing appropriate signaling to the call handler 121.

In some embodiments, servers may be configured to perform a particular task or a set of tasks specific to supporting functions of the channel management engine 125. For instance, the channel management engine 125 may correspond to a server or set of servers that are configured to receive information and make decisions regarding managing channel changes as they relate to communications within the contact center 120. A single server or a set of servers may be configured to execute one or more scripts (referred to herein interchangeably as "scripts" or "script") to perform the functionality.

The scripts of the channel management engine 125 may control when or how information is used or applied to manage channel changes. In some embodiments, information may be obtained based on monitoring a participant's textual communications, speech, and/or appearance based on certain conditions occurring, such as detecting a key word, detecting a sentiment of the participant, etc. In additional embodiments, the scripts may report out whenever any new information is detected for any of the communication session participants.

Events received by the call handler 121 from the channel management engine 125 may include various types of identifying information indicating how channel changes are applied, e.g., any type of communication identifier may be included in the event. In some embodiments, multiple communications, resources, and/or properties may be applicable to an event. Events may be transmitted in real-time from one or more components described in FIG. 1 to the call handler 121. In some embodiments, timing information (e.g., a time-stamp) regarding the event may be provided. Thus, the scripts can account for the timing information if desired, as well as accounting for other event information.

The scripts executing in a processor (e.g., in the channel management engine 125 and/or in the call handler 121) can further define what action(s) should occur upon receiving the event. Thus, scripts may be used to implement channel changes in the contact center 120 as well as management of the channel changes. In some embodiments, the scripts may incorporate multiple threads of logic for acting on distinct event notifications, or separate scripts may concurrently act upon a same communication.

Various actions may occur, or be taken by components of the system, including by agents 131A-131N of the contact center 120, before, during, or after channel change is managed, in response to the events and/or in response to management of a channel change. For example, information may be managed (e.g., stored, reported, analyzed, etc.). This may be done in an automated manner, or by human action. Data can be written indicating that a particular context occurred, any properties that were detected, what occurred for which communications and/or which channel, etc. In various embodiments, an agent may have a role in managing the data, or the data may be managed without human or agent interaction, such as by an artificial intelligence component.

The embodiments disclosed herein advantageously are a powerful tool to augment the contact center's capabilities using channel changes. For example, channel changes may be more efficiently managed for communications of the contact center 120, which can help avoid or reduce various issues within the contact center 120 by proactively managing potential issues through improved channel changes.

Figure 2:
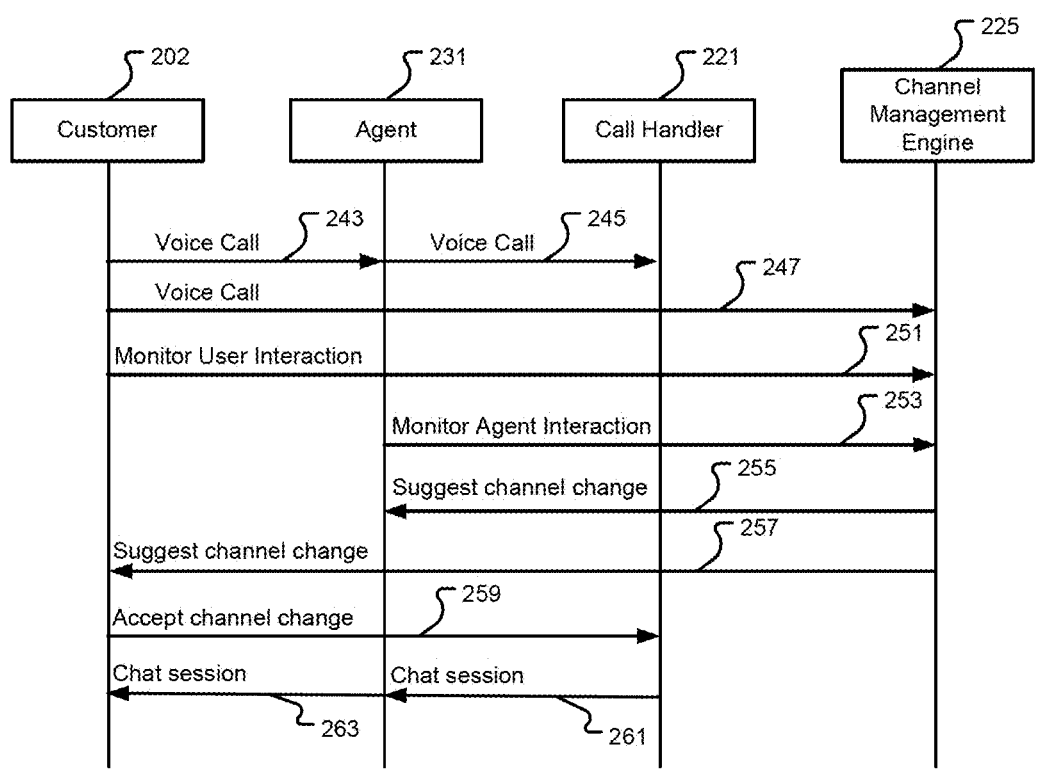
FIG. 2 is a message flow of various configurations of using a channel management engine in accordance with at least some embodiments of the present disclosure.

FIG. 2 is a message flow of various configurations of using a channel management engine in accordance with at least some embodiments of the present disclosure. In some aspects, the components shown in FIG. 2 may correspond to like components shown in FIG. 1. In the illustrative message flow of FIG. 2, the customer 202, the agent 231, the call handler 221, and the channel management engine 225 are shown and the message flow provides an example application of channel change management.

A customer 202 places a voice call 243 to a contact center to obtain help with a mobile device hotspot issue and is connected to an agent 231. Although FIG. 2 shows a customer 202 and an agent 231, as a person of ordinary skill in the art would understand and appreciate, in other examples the customer 202 and agent 231 may establish various communication channels using one or more devices. The voice call 243 may be handled by a call handler 221 by being sent as voice call 245 to the call handler 221. Although two voice calls 243, 245 are shown in FIG. 2 as occurring at substantially the same time and being connected between the customer 202 and agent 231, and connected between the agent 231 and call handler 221, respectively, the voice communication can occur at other timings, different times, and different intervals of time. For example, the call handler 221 can originate an outbound communication to a customer and can establish contemporaneously a communication to an agent. Thus, in various ways, the call handler 221 can establish a call between the customer 202 and the agent 231.

In various embodiments, the voice call may also be monitored for any specified information or events. For example, a communications channel can be established between customer 202 and the channel management engine 225. In the message flow of FIG. 2, voice call 247 is established between customer 202 and the channel management engine 225 and the channel management engine 225 is able to receive data (e.g., audio and/or visual data) from the voice call 247, and perform processing on the data. This processing may involve identifying audio and/or visual content (e.g., content from the agent 231 versus the customer 202) and processing the audio and/or visual content. For example, the processing can identify phenomes in the audio that are used to detect key words. Further processing of the audio can include detecting key words or changes in tone or level of voice and determining appropriate information to process and/or provide to the call handler 221, the agent 231, and/or the customer 202. When the channel management engine 225 is able to receive data from a communication session, it is able to detect relevant information (e.g., words or sentiments expressed by the agent 231 and/or the customer 202). In various embodiments, voice call 247 transfers the same communication data as voice call 243 and voice call 245, so that the channel management engine 225 receives all the data from the communication session between customer 202 and agent 231. Although the voice call 247 is shown as occurring later than voice calls 243, 245, these voice calls may occur at substantially the same time or can occur at other timings, different times, and different intervals of time. For example, the call handler 221 can originate an outbound communication to a callee (e.g., a called party) and can establish contemporaneously a communication to an agent 231 and the channel management engine 225.

The channel management engine 225 may include one or more control logic scripts executed by a processor that define functionality associated with the functionality of the channel management engine 225. For example, one or more scripts can define what to monitor (e.g., sentiments expressed, the agent's 231 speech, the customer's 202 speech, all audio content, all video content, etc.), when to perform the monitoring, and how to apply information to determine channel management as described herein, among other criteria. Other scripts can define what is sent to the call handler 221 indicating that certain information (e.g., sentiment(s), word(s), image(s)) has been detected. The channel management engine 225 may also be able to receive communication session identification information and associate the communication session with the relevant information. After the voice call 247 is received at the channel management engine 225, time proceeds as the voice call progresses and the customer interaction is monitored 251 and the agent interaction is monitored 253. For example, the customer's and/or agent's words, sentiment, content transmitted, and any other performance measures or information may be monitored. Thus, relevant information (such as a negative sentiment) is detected in the audio of voice call 247 while the agent interaction is monitored 253.

The negative sentiment in the audio of voice call 247 may be detected using machine learning together with natural language processing. In various embodiments, this processing may use aspect-based sentiment analysis. Some embodiments use specialized sentiment analysis models. Such models can find not only polarity (e.g., positive, negative, and neutral) of sentiments but also feelings and emotions (including angry, happy, sad, excited, etc.). Thus, in some embodiments, a negative sentiment may be detected based on the customer stating a negative word, such as "frustrated" together with a rise in the customer's voice volume.

For example, the voice call 247 may be continuously monitored for any information that triggers a channel change analysis. During the communication session (e.g., voice call 247), an artificial intelligence system of the channel management engine 225 may compare the customer's vocal expressions with stored sentiment data and thereby determine, during the communication session, that the customer 202 has a negative vocal expression. This determination may be done using one or more thresholds that indicate that a channel change analysis is needed, such as a threshold for the mention of the word "frustrated" together with a threshold for the customer's volume of voice. The artificial intelligence system may then perform the channel change analysis and determine that this information is relevant to the channel that the customer 202 is using to communicate with the agent 231 because historical data for customers calling to obtain support for a mobile device hotspot issue shows that, for this content of the communication session, a chat channel results in a more efficient resolution and a happier customer. Based on the detected negative sentiment, the information that the communication is a voice communication session, and the information that the customer is calling for support with a mobile device hotspot issue, the channel management engine 225 determines (e.g., using the analysis information from an artificial intelligence system) that a channel change may be beneficial so that an agent may provide support via a chat session instead of the voice session. Thus, the channel management engine 225 determines that the channel of the voice call between customer 202 and agent 231 should be changed to a chat channel.

The channel management engine sends a suggested channel change 255 to the agent 231 notifying the agent that a suggest channel change to a chat channel will be sent to customer 202, and then sends a suggested channel change 257 to the customer 202. The suggested channel change 255 is sent to the agent 231 as a message displayed on the agent's terminal and the suggested channel change 257 is sent to the customer 202 as a SMS message containing the suggestion to switch the communication session to a chat session together with a link to a chat room, where the customer 202 may click on the link to connect to the chat room. In various embodiments disclosed herein, a suggested channel change may be sent to only one of a customer or an agent, or may be sent to both, at any timing. The suggested channel change may be sent using any modality regardless of a channel of any current communication session.

Suggestions for a channel change may be sent in any manner. As some illustrative examples, the suggestion may be executed using an inbound communication with a code, using a direct outbound communication, and using an internet browser based session. In some embodiments, for a suggestion to switch to a text based support channel, the suggestion for the channel change may be sent via text. For a suggestion to switch to a voice call, a link to schedule a voice call and have an agent call the customer may be sent to the customer, or a link that opens a direct voice channel to the agent may be sent to the customer to click on. Any configuration is possible. As another example, if a browser based session is suggested, then a link may be sent via chat or messaging to connect to the browser based session. Other illustrative embodiments are to include a code together with a phone number so that when a customer is in an IVR system, the customer can punch in the code to be connected directly to a voice line that is a direct line to the specific agent. If a customer and an agent are in a communication session, the same agent can ask the customer for the customer's number so that the agent can call the customer. The agent may also perform a click to call on the agent side in order to call the customer. Suggestions may be sent to an agent in addition to, or instead of, sending the suggestion to the customer.

Responses to the suggestions may also be handled in any manner; the customer and/or agent can confirm or reject a suggestion. As some illustrative examples, if a channel change suggestion is sent to an agent (or customer), the agent (or customer) can accept or reject the suggestion of the artificial intelligence system. In further embodiments, the system may automatically initiate a chat session (either in response to a customer confirmation, or automatically without human input). In this example, the agent may be notified that the chat session is being established and to please be aware of the chat session and to use the chat session. Alternatively, the system may automatically initiate a chat session (e.g., in response to an agent confirmation) and the customer may be notified that the chat session is being established and to please be aware of the chat session and to use the chat session. A channel change may be suggested to one or more users, and a response may be received, without telling one or more other users in the communication session.

The customer 202 accepts the channel change 259, e.g., by clicking on the link contained in the SMS message containing the suggestion to switch the voice communication session to a chat communication session, thereby notifying the call handler 221 to change the channel from voice to chat. The call handler 221 establishes the chat session 261 with the agent 231 and the chat session with the customer 202, thereby connecting the agent 231 and the customer 202 in a chat communication session. Although two chat sessions 261, 263 are shown in FIG. 2 as occurring at substantially the same time and being connected between the agent 231 and call handler 221, and connected between the customer 202 and agent 231, respectively, the chat session can occur at other timings, different times, and different intervals of time. For example, the call handler 221 can originate an outbound chat communication to a customer and can establish contemporaneously a chat communication to an agent. Thus, in various ways, the call handler 221 can establish a chat communication session between the customer 202 and the agent 231. Further, although not shown, the actions and message flows connecting the customer 202 and the agent 231 may be detected by, or reported to, the channel management engine 225 at any point in time.

As shown in FIG. 2, the channel management engine 225 may advantageously determine when and how to change channel(s) for communication sessions by, for example, analyzing communication sessions, channels, and other information. In various embodiments, the channel management engine 225 may advantageously determine when and how to change channel(s) for communication sessions by performing comparisons and monitoring for thresholds. These methods and systems may advantageously provide more efficient communication session outcomes and thereby to improve customer satisfaction and the functioning of the contact center 120.

Figure 3:
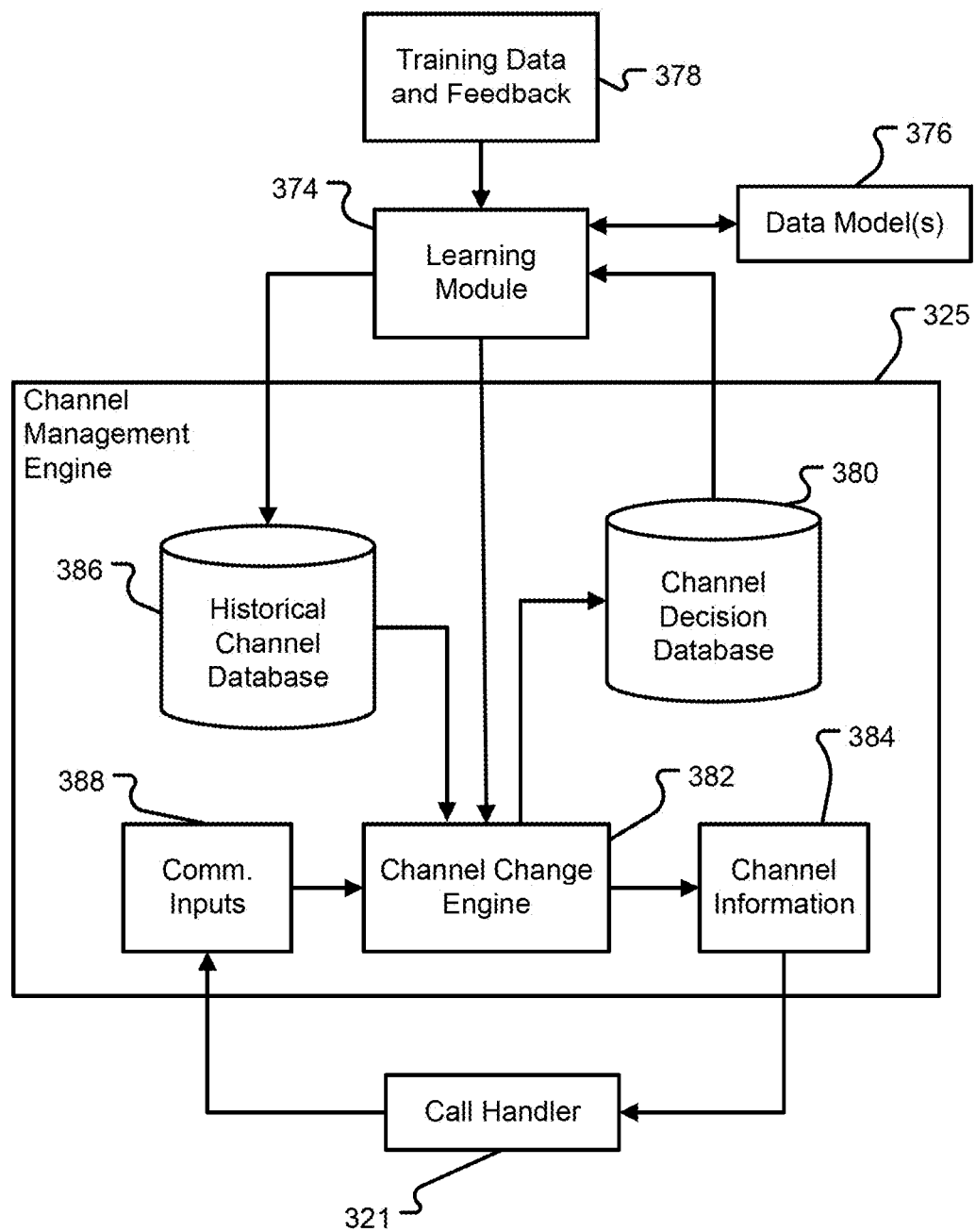
FIG. 3 is a block diagram depicting additional details of a channel management engine in accordance with at least some embodiments of the present disclosure.

FIG. 3 is a block diagram depicting additional illustrative details of a channel management engine in accordance with at least some embodiments of the present disclosure. In some aspects, the components shown in FIG. 3 may correspond to like components shown in FIGS. 1 and 2. In FIG. 3, a channel management engine 325 interacts with a call handler 321, and a learning module 374. The learning module 374 receives input from training data and feedback 378 and sends and receives information from data model(s) 376. The channel management engine 325 includes a historical channel database 386, a channel decision database 380, a communication inputs 388, a channel change engine 382, and channel information 384.

The learning module 374 may utilize machine learning and have access to training data and feedback 378 to initially train behaviors of the learning module 374. Training data and feedback 378 contains training data and feedback data that can be used for initial training of the learning module 374 and this training data may be different than, and is not to be confused with, training data for training agents. The learning module 374 may also be configured to learn from other data, such as any contact center events, communication exchanges, and/or feedback, which may be provided in an automated fashion (e.g., via a recursive learning neural network) and/or a human-provided fashion (e.g., by one or more human agents, such as agents 131A-131N, by one or more users, by a quality manager agent, etc.). The learning module 374 may additionally utilize training data and feedback 378. For example, the learning module 374 may have access to one or more data model(s) 376 and the data model(s) 376 may be built and updated by the learning module 374 based on the training data and feedback 378. The data model(s) 376 may be provided in any number of formats or forms. Non-limiting examples of data model(s) 376 include Decision Trees, Support Vector Machines (SVMs), Nearest Neighbor, and/or Bayesian classifiers.

The learning module 374 may also be configured to access information from a channel decision database 380 for purposes of building a historical channel database 386. The channel decision database 380 stores data related to channel changes, including but not limited to channel change history, agent(s) (e.g., one or more of agents 131A-131N) notes associated with channel changes, results of channel changes, data associated with communication sessions as they relate to channels, data associated with users as they relate to channels, etc. Channel information within the historical channel database 386 may constantly be updated, revised, edited, or deleted by the learning module 374 as the channel management engine 325 processes additional channel change decisions.

In some embodiments, the channel management engine 325 may include a channel change engine 382 that has access to the historical channel database 386 and selects appropriate channel change decisions (e.g., presented in channel information 384) based on input from the historical channel database 386 and based on communication inputs 388 received from the call handler 321. The channel management engine 325 may receive communication inputs 388 in the form of information (e.g., communication session and/or other communication information) from the call handler 321. For example, the communication inputs 388 may include information about any channel change(s) recently performed for any communication sessions as well as other information from the call handler 321.

To enhance capabilities of the channel change engine 382, the channel change engine 382 may constantly be provided with training data and feedback 378 from communications between agents and customers that have occurred over a particular timeframe, communication channel, location, and/or other parameters. Therefore, it may be possible to train a channel change engine 382 to have a particular output or multiple outputs. In various embodiments, the output of an artificial intelligence application (e.g., learning module 374) is one or more channel change decisions with appropriate information conveying how to manage the channel change with respect to specified communications, via the channel change engine 382 and from channel information 384, to the call handler 321.

Using the communication inputs 388 and the historical channel database 386, the channel management engine 325 may be configured to provide channel information 384 (e.g., channel changes) to the call handler 321 so that the call handler 321 can manage channel changes for one or more communication sessions. Channel information 384 may include attributes provided to a user, such as providing a heads-up chat template to an agent.

As discussed herein, the channel management engine 325 may manage channel changes using information such as key words, sentiments, properties of a user (e.g., customers from similar geographical region, having a similar language, having a similar accent, and/or having similar content of the communication). Information related to a customer and/or an agent may be used. In some embodiments, the system can analyze past transactions to determine information related to users and/or channels. In further embodiments, the system can analyze the agents across different channels in order to select an optimal channel based on agent skills, e.g., not just using an analysis of transaction. The information may be received from call handler 321 (via communication inputs 388), from historical channel database 386, and/or from learning module 374.

In various embodiments, a complexity of the content of a communication session is determined and is used in a channel change analysis by the channel management engine 325 to determine how to manage channels. For example, a complexity could be determined based on key words that are detected during the communication session (e.g., detected via text analysis, Natural Language Processing (NLP), artificial intelligence, etc.), or by monitoring performance measures. In some aspects, a determination of complexity may be similar to a determination of sentiment, e.g., by using key words and/or thresholds. Properties of a user and other information may be similarly determined and used by the channel management engine 325. Artificial intelligence and/or user preference can determine and use monitored attributes. For example, artificial intelligence and/or user preference can determine how, when, and which key words are monitored, as well as how, when, and which attributes are monitored.

In one illustrative example, when a repeat customer contacts the contact center, the artificial intelligence system may check to determine historical information associated with the customer and propose a best channel for the customer depending on attributes. Attributes that may be associated with the customer can include the history of efficiency of call handling over a certain channel, historical customer feedback, downstream call analysis, and context complexity, among others. In some aspects, the artificial intelligence system can propose a channel change before even connecting a communication in order to increase customer satisfaction and/or improve efficiency.

The artificial intelligence model(s), e.g., data model(s), may be trained based on input data that includes and is not limited to a skill level of each agent on any given channel (or on a combination of channels), a rate of call handling efficiency on a channel. (e.g., voice only versus voice and chat together), a length of time spent on a communication in a particular phase or portion of an agent script or workflow (e.g., if a customer is having trouble browsing to a help page, or a communication is going longer than average), accent based (e.g., when the customer and/or agent has a strong accent, or when a mismatch of accents occurs, then the system may suggest changing the channel to be a chat or chat plus voice for the communication session in question), how many times an agent has to confirm a problem with the customer, a customer and/or agent sentiment analysis (e.g., if a discussion occurring during the communication session is frustrating the customer), an analysis of the effectiveness of a channel depending on a complexity of the discussion occurring in the communication session (e.g., a model may learn that adding text at a specific point in a script (or modifying a specific page or screen viewed by the agent) where the agent discusses going to a help page on a website could benefit from adding chat to the call), and combinations thereof.

The artificial intelligence model can learn based on various factors that include an immediate approval or disapproval by an agent of an attempt to add or switch channels, a post-session analysis by quality management regarding whether a channel change should have been offered at any point during the communication session, customer feedback (e.g., based on satisfaction of changing a channel, or any notes regarding reasoning for why a channel change was not attempted (or should have been attempted)), input from a supervisor (or other observer) during the communication session noting that a specific channel change should have been offered (or should have been accepted, should have been rejected, etc.), and combinations thereof.

In various embodiments, there can be little or no human management of the channel changes as disclosed herein. Channel change management may be performed on an ad hoc basis. For example, an artificial intelligence or machine learning application may be enabled to integrate with the systems and methods of the contact center 120 in order to advantageously manage channel changes. Such embodiments are advantageous because, by automating and quickly adjusting (with little or no manual configuration) channel changes in the contact center 120, resources of the contact center 120 are saved.

In some embodiments, the channel management engine 325 may interact with the contact center 120 as follows. The call handler 321 may serve a plurality of agent terminals 130A-130N and there can be a plurality of communications occurring between the call handler 321 and the user endpoints 101A-101N. Event notifications are created by scripts in the contact center 120 and/or the channel management engine 325. The scripts in the channel management engine 325 may be run by the channel change engine 382 using information from one or more of the communication inputs 388, the historical channel database 386, and/or the learning module 374. The scripts can create events that are posted to the bus in the call handler 321, and the events may map communication reference information in each event to a particular communication or group of communications (e.g., by a identifying a particular agent terminal, user endpoint, skill group 124, contact center queue 123, etc.), so that any actions performed based on the event can be appropriately implemented to the desired communication or set of communications. The set of communications may be all communications involving any one or more agents, agent terminals 130A-130N, users, user endpoints 101A-101N, skill group 124, contact center queue 123, etc. The scripts may create events that are directed to a common resource (e.g., a database, a contact center queue 123, a skills group 124, etc.) that multiple agents use, or events that are directed to a common property or properties (e.g., a geographical location, a specific business name, a user identification, a key word, and/or a key phrase, among others), and such events may require different variations in mapping. Thus, events related to managing channel changes are entirely customizable, and have the ability to be communication-specific, and/or to be directed to a common channel, resource, and/or property, etc.

Advantages of the embodiments described herein include an increase in efficiency, a better ability to train or assist an agent, and an ability to improve contact center performance (e.g., if the system knows that there is a correlation for a better outcome when there is a channel change at a specific time)

Figure 4:
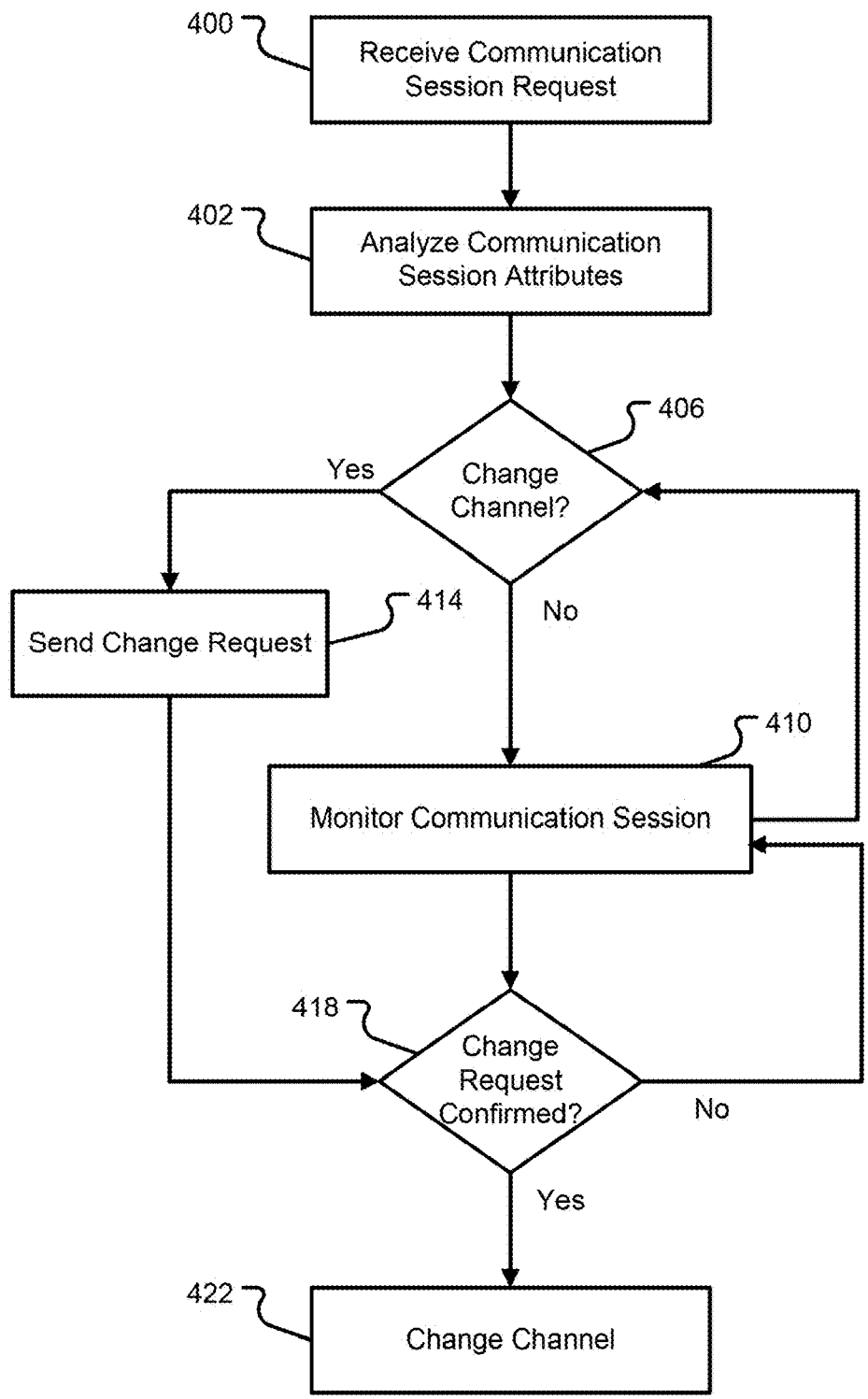
FIG. 4 is a flow diagram depicting a first method in accordance with at least some embodiments of the present disclosure.

Referring now to FIG. 4, a first communication method will be described in accordance with at least some embodiments of the present disclosure. In some aspects, the components discussed with respect to FIG. 4 may correspond to like components discussed in the other figures described herein.

The method begins when a request to begin a communication session is received at step 400. The request to begin a communication session may be received from any type of user, including a customer or an agent, and may be any one or more types of request, including a dialed phone number, video call request, a chat initiation request, and a messaging request, among others. The request may also be originated by a system as an event; e.g., as a previously scheduled request to initiate a communication session at a certain timing (including at a scheduled time, when an agent becomes available, when a status changes, etc.). Thus, the communication request may be from a user via a communication device (e.g., one or more of communication endpoints) and received in a contact center. The communication associated with the request may be any type of communication described herein (e.g., text-based communication, chat communication, SMS communication, webcast communication, email communication, voice communication, video communication, etc.). In various embodiments, the communication request can be received at a channel management engine at a same time as, or after, it is received at the contact center.

At step 402, the communication session attributes 402 are analyzed to determine if a channel change analysis should occur. For example, attributes related to any or all participants of the communication session may be analyzed, along with any attributes related to the communication session, such as historical communication session information and related communication session information including channel information. The analysis may be performed automatically, and may be performed by a channel management engine, for example. The analysis of step 402 may occur at any time when a communication session request is received, and may occur before, during, and/or after the communication session is initiated (e.g., a callee is connected with a caller). The analysis of communication session attributes may occur at one or more discrete points in time, or may be a continuous analysis; thus, it may occur from before the communication session is connected, during a timeframe when the communication session is connected, and/or after the communication session is connected.

Based on the analysis of communication session attributes in step 402, a determination is made regarding whether a channel change should occur at step 406. In various embodiments, some or all of the analysis of step 402 may occur in combination with the channel change determination of step 406. The channel management engine may perform the channel change analysis of step 406 and may determine whether a channel of the communication session request should be changed, added, or reduced.

If the channel of the requested communication session should not be changed, then the method proceeds to step 410 and the communication session is monitored. The monitoring can continue from a time when the request for the communication session was received (e.g., at step 400) or it may begin at any other time. For example, it may begin at step 410. In some embodiments, the communication is monitored starting from when the communication session is connected. If the channel of the requested communication session should be changed, then the method proceeds to step 414, and a channel change request is formatted (e.g., by a channel management engine) and sent to one or more users.

The channel change request may contain any amount of information. For example, in some embodiments, the channel change request may contain an explanation of why the channel change is being requested. In other embodiments, the channel change request may include information about the channel(s) that the request wants to change and also provide the user with one or more options to respond to the request (e.g., the user may select to confirm the channel change). In some embodiments, the request may include options to alter the channel change by selecting between different channels. The channel change request may be acted upon at any timing before or during the communication session. For example, the request (with the options to confirm or deny the request) may remain available to the user from when it is received until when the communication session ends, so that the user may select to confirm the channel change at any point in time during the communication session. In various embodiments, the user may confirm the channel change by selecting an option (e.g., "yes" or "no") to change one or more channels.

After the channel change request is confirmed at step 418 (e.g., the user confirms to change the channel per the suggestion), then the channel is changed at step 422. If the user chooses to not change a channel of the communication session, then the method proceeds back to step 410 and the communication session continues to be monitored.

Figure 5:
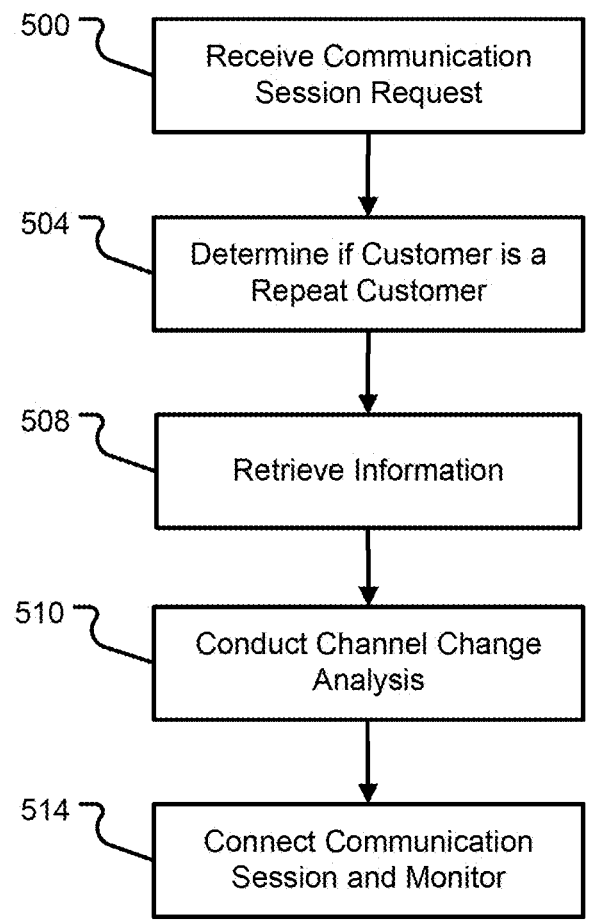
FIG. 5 is a flow diagram depicting a second method in accordance with at least some embodiments of the present disclosure.

Referring now to FIG. 5, a second communication method will be described in accordance with at least some embodiments of the present disclosure. In some aspects, the components discussed with respect to FIG. 5 may correspond to like components discussed in the other figures described herein.

The method begins when a request to begin a communication session is received at step 500. Following the request, the method determines if a customer making the request is a repeat customer at step 504. The channel management engine may determine if the customer is a repeat customer by various means, such as by searching for historical data associated with the customer name or other identifying information. Thus, in some aspects, the method may look at historical data to determine if the customer has conducted a communication session at the contact center previously.

At step 508, the system retrieves information. For example, if the customer is a repeat customer, as determined in step 504, then the system may retrieve information related to the customer. Information related to the customer can include information about results of prior communication sessions of the customer as they relate to different channels. In addition, other information may be retrieved at step 508, such as information related to the channel of the communication session request, information related to one or more users (including one or more agents to which the communication session may be connected), and information related to any other attributes of the communication session and/or the channel.

After the information is retrieved at step 508, the method conducts a channel change analysis at step 510. In various embodiments, to conduct the channel change analysis, a channel management engine may analyze the information retrieved at step 508. For example, the channel management engine may analyze information about channel(s) over which the communication session might be connected, agent(s) to whom the communication session might be connected, and other information related to the communication session and/or channel, including any information about results of prior communication sessions of the customer as they relate to different channels. The channel change analysis thereby determines an optimal channel for the communication session. The optimal channel may be a channel already requested by the customer in the communication session request, it may be a different channel than what was requested by the customer in the communication session request, or it may be any combination of multiple channels.

In the embodiments described in FIG. 5, the channel change analysis determines an optimal channel and automatically implements any necessary channel change. Thus, at step 514, the communication session is connected over the channel(s) suggested from the channel change analysis at step 510, and monitoring of the communication session begins.

In various embodiments, the system may send a notification or another type of communication to one or more of the users of the communication session to notify them of the channel change. Notifications may be sent at any step in the method, to any user(s).

Figure 6:
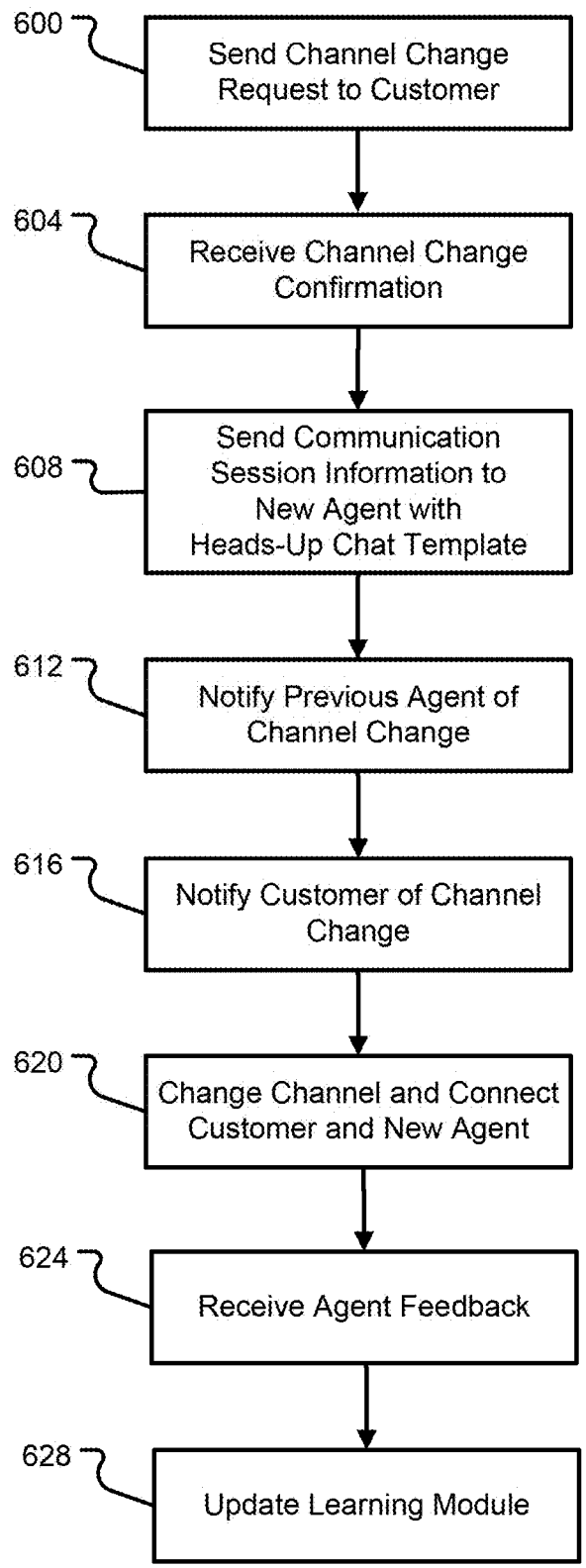
FIG. 6 is a flow diagram depicting a third method in accordance with at least some embodiments of the present disclosure.

Referring now to FIG. 6, a third communication method will be described in accordance with at least some embodiments of the present disclosure. In some aspects, the components discussed with respect to FIG. 6 may correspond to like components discussed in the other figures described herein.

The method begins when a channel change request is sent to a customer at step 600. For example, a video communication session may be in progress prior to step 600 and be monitored by the system prior to step 600. At step 600, the system has determined that a channel change should be suggested to a customer to change the channel from a video channel to a chat channel with a new agent, and based on the channel change suggestion a channel change request is sent to the customer at step 600.

At step 604, the system receives the channel change confirmation. For example, after the customer receives the channel change request, the customer selects a confirmation to proceed with changing the channel to be a chat channel. The confirmation is received as channel change confirmation at step 604 and it confirms that the customer is willing to switch the channel to a different channel having a new agent; however, the video communication session continues with the agent of the video channel during this time. Advantageously, the customer maintains a connection to an agent even after selecting the channel change confirmation in case there is a delay in changing the channel.

At step 608, based on the channel change confirmation, communication session information is sent to the new agent of the chat session, and the information is formatted as a heads-up chat template. The heads-up chat template may provide relevant information to the new agent about the incoming chat communication session. For example, it may contain identifying information about the customer, whether the customer is a repeat customer, topics of discussion from the video communication session, and identification of any relevant problems with the video communication session. The heads-up chat template can help the chat agent to ask minimum questions from the customer, thereby advantageously improving customer sentiment and contact center performance.

At step 612, the previous agent (e.g., the agent conducting the video communication session) is notified of the channel change. At step 616, the customer is notified of the channel change. The sending of the heads-up chat template and the notification of the channel change may occur at any point in time following the analysis the results of the analysis of the channel change. Alternatively, in some embodiments, no notifications may be sent and the system may proceed with the channel change after receiving the channel change confirmation at step 604.

At step 620, the channel is changed and the customer is connected with the new agent (e.g., the chat agent) to continue the communication session. The video communication session may disconnect at any timing and may continue up to or after the customer is connected to the chat channel.

At step 624, agent feedback is received. The agent feedback may be received at any point in time, including during the communication sessions and after the communication session. The agent feedback may be from the previous agent and/or the new agent and it may provide information that is relevant to determining how effective and beneficial (or not) the channel change was. The system may use the agent feedback to update the learning module at step 628. Updating the learning module may advantageously improve channel change management of future communication sessions.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights, which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of managing a first channel, the method comprising:
   receiving a request for a communication session on the first channel;
   determining that an attribute of the communication session has met a first threshold;
   comparing, by a channel change analysis, a first performance measure of the first channel with a second performance measure of a second channel;
   managing a channel change based on the determining and the channel change analysis; and
   sending, prior to the communication session being connected on the first channel and after the request for the communication session on the first channel has been received, a suggestion as part of managing the channel change that suggests the communication session change from the first channel to the second channel.

2. The method of claim 1, wherein the managing comprises sending a suggestion to execute the channel change.

3. The method of claim 1, wherein the first performance measure comprises the attribute.

4. The method of claim 1, wherein the attribute is a sentiment.

5. The method of claim 4, wherein the communication session is between a customer and an agent of a contact center, and wherein the sentiment is a customer sentiment.

6. The method of claim 1, wherein the suggestion is sent as a link to the second channel.

7. The method of claim 1, further comprising receiving a confirmation to change the first channel to the second channel.

8. The method of claim 1, further comprising receiving a rejection of the channel change comprising instructions to not change the first channel to the second channel.

9. The method of claim 1, further comprising:
   storing a result of the channel change analysis in a database comprising channel change information;
   enabling a machine learning process to analyze the database; and
   updating a data model used to automatically determine channel change management based on the channel change analysis of the machine learning process.

10. The method of claim 9, wherein the data model is used to classify channel changes, and further comprising managing a second channel change related to the first channel based on the classification.

11. The method of claim 9, wherein the machine learning process performs an analysis of a sentiment contained in the communication session.

12. A communication system, comprising:
    a processor; and
    computer memory storing data thereon that enables the processor to:
    receive a request for a communication session on a first channel;
    determine that an attribute of the communication session has met a first threshold;
    compare, by a channel change analysis, a first performance measure of the first channel with a second performance measure of a second channel;
    manage a channel change based on the determining and the channel change analysis; and
    sending, prior to the communication session being connected on the first channel and after the request for the communication session on the first channel has been received, a suggestion as part of managing the channel change that suggests the communication session change from the first channel to the second channel.

13. The communication system of claim 12, wherein the processor is further enabled to send a suggestion to execute the channel change.

14. The communication system of claim 12, wherein an agent of a contact center is participating in the communication session, and wherein the attribute is a customer sentiment.

15. The communication system of claim 12, wherein the processor is further enabled to change the first channel to the second channel.

16. The communication system of claim 12, wherein the processor is further enabled to provide a heads-up chat template to an agent associated with the second channel.

17. The communication system of claim 12, wherein the processor is further enabled to:
    store a result of the channel change analysis in a database comprising channel change information;
    enable a machine learning process to analyze the database; and
    update a data model used to automatically determine channel change management based on the channel change nalysis of the machine learning process.

18. A contact center, comprising:
    a server comprising a processor and a channel change engine that is executable by the processor and that enables the processor to:

receive a request for a communication session on a first channel;

determine that an attribute of the communication session has met a first threshold;

compare, by a channel change analysis, a first performance measure of the first channel with a second performance measure of a second channel;

manage a channel change based on the determining and the channel change analysis; and sending, prior to the communication session being connected on the first channel and after the request for the communication session on the first channel has been received, a suggestion as part of managing the channel change that suggests the communication session change from the first channel to the second channel.

19. The contact center of claim 18, wherein the processor is further enabled to send a suggestion to execute the channel change.

20. The contact center of claim 18, wherein the first performance measure comprises the attribute.

\* \* \* \* \*

UNITED STATES PATENT AND TRADEMARK OFFICE
CERTIFICATE OF CORRECTION

| | |
|---|---|
| PATENT NO. | : 11,720,835 B2 |
| APPLICATION NO. | : 17/185599 |
| DATED | : August 8, 2023 |
| INVENTOR(S) | : Valentine C. Matula, Manish Negi and Divakar Ray |

It is certified that error appears in the above-identified patent and that said Letters Patent is hereby corrected as shown below:

In the Claims

At Column 32, Line 62, delete "nalysis" and insert --analysis-- therein.

Signed and Sealed this
Twenty-first Day of November, 2023

Katherine Kelly Vidal
*Director of the United States Patent and Trademark Office*